(12) United States Patent
Voorsluys et al.

(10) Patent No.: US 12,396,431 B2
(45) Date of Patent: Aug. 26, 2025

(54) METHOD FOR ROBOTIC MILKING AND ROBOTIC MILKING DEVICE

(71) Applicant: LELY PATENT N.V., Maassluis (NL)

(72) Inventors: Mario Henrique Voorsluys, Maassluis (NL); Thanh Mung Lam, Maassluis (NL); Jan Gerrit Jonathan Meijer, Maassluis (NL)

(73) Assignee: LELY PATENT N.V., Maassluis (NL)

( * ) Notice: Subject to any disclaimer, the term of this patent is extended or adjusted under 35 U.S.C. 154(b) by 248 days.

(21) Appl. No.: 18/251,496

(22) PCT Filed: Nov. 11, 2021

(86) PCT No.: PCT/IB2021/060434
§ 371 (c)(1),
(2) Date: May 2, 2023

(87) PCT Pub. No.: WO2022/101815
PCT Pub. Date: May 19, 2022

(65) Prior Publication Data
US 2024/0008440 A1 Jan. 11, 2024

(30) Foreign Application Priority Data
Nov. 16, 2020 (NL) ..................................... 2026900

(51) Int. Cl.
*A01J 5/017* (2006.01)
*A01J 5/007* (2006.01)

(52) U.S. Cl.
CPC ............. *A01J 5/0175* (2013.01); *A01J 5/007* (2013.01)

(58) Field of Classification Search
CPC ..................................................... A01J 5/007
See application file for complete search history.

(56) References Cited

U.S. PATENT DOCUMENTS

2015/0107518 A1* 4/2015 Anglart ................ A01J 5/0175
119/14.02

FOREIGN PATENT DOCUMENTS

| EP | 1 479 290 A1 | 11/2004 |
| EP | 1 709 867 A1 | 10/2006 |
| GB | 2 218 888 A | 11/1989 |

OTHER PUBLICATIONS

Translation of EP0639327A1 (Year: 1995).*
International Search Report Issued Jan. 27, 2022, in PCT/IB2021/060434, filed on Nov. 11, 2021, 2 pages.

* cited by examiner

*Primary Examiner* — Monica L Perry
*Assistant Examiner* — Brittany A Lowery
(74) *Attorney, Agent, or Firm* — Oblon, McClelland, Maier & Neustadt, L.L.P.

(57) ABSTRACT

A method for milking a dairy animal by means of a robotic milking device containing milking cups, a teat position-determining device, a robot arm in a rest position that carries all milking cups and attaches these to the teats, and a control unit. The dairy animal is milked at an intended milking frequency. The method involves determining if the distance between two teats of the dairy animal is greater than a first threshold distance by means of the teat position-determining device. If the distance is at most equal to the first threshold distance, a usual attachment and milking step is performed. If the distance is greater than the first threshold distance, a modified milking step is performed. A corresponding device is also provided. Milking of the second teat only takes place when the udder has already shrunk, and the teats are closer together as a result.

10 Claims, 1 Drawing Sheet

METHOD FOR ROBOTIC MILKING AND ROBOTIC MILKING DEVICE

This application is a 35 U.S.C. § 371 application of PCT/IB2021/060434 filed Nov. 11, 2021 and claims benefit of NL 2026900, filed Nov. 16, 2020. The contents of each of these applications are incorporated herein by reference.

In a first aspect, the present invention relates to a method for milking a dairy animal in milking operations by means of a robotic milking device. The robotic milking device comprises milking means with a plurality of milking cups to be attached to the teats of the dairy animal, a teat position-determining device which is configured to measure the positions of the teats, a robot arm which, in a rest position, carries all milking cups and which is configured to attach the milking cups to the teats, and a control unit for controlling the robotic milking device in order to milk the dairy animal at an intended milking frequency in a milking operation.

By now, such robotic milking devices are well-known, for example those by Lely Industries (Astronaut® A5), GEA (DairyRobot R9500), and Fullwood (M²erlin). Such milking robots perform milking in a fully automated way, in which the robot arm attaches the milking cups to the teats which are then milked. In the inoperative state, the robot arm used carries all milking cups, such as four in the case of dairy cows. During a milking operation, the milking cups are suspended freely under the dairy animal, that is to say to the teats, and are connected to the milking device by means of the short milking hose and in many cases also by a separate retracting means. In this case, the robot arm remains in the vicinity, and usually under the milking cups. After the milking operation, the milking cups are replaced on the robot arm.

These known methods for milking using such robotic milking devices generally work satisfactorily. In addition, due to the fact that the robot arm is kept near and under the milking cups, there is little risk of the latter falling on the floor which is usually extremely soiled. However, it is a drawback that it has been found that it is not possible to reliably milk a dairy animal in all cases. This may apply in particular to highly productive dairy animals. However, dairy animals which cannot be milked in a reliable manner are often removed from the herd which is undesirable.

It is an object of the present invention to alleviate or eliminate the abovementioned drawback and to provide a method of the kind indicated which provides greater reliability, in particular with highly productive dairy animals and, in addition, to ensure that these latter animals remain part of the herd of dairy animals.

To this end, the invention provides a method as claimed in claim 1, in particular a method for milking a dairy animal in milking operations by means of a robotic milking device, which robotic milking device comprises milking means with a plurality of milking cups to be attached to the teats of the dairy animal, a teat position-determining device which is configured to measure the positions of the teats, a robot arm which, in a rest position, carries all milking cups and which is configured to attach the milking cups to the teats, and a control unit for controlling the robotic milking device in order to milk the dairy animal at an intended milking frequency in a milking operation, wherein the method comprises determining, by means of the teat position-determining device, if the distance between two teats of the dairy animal, in particular between two front teats and/or two rear teats, is at least as great as a predetermined first threshold distance. If said distance is not greater than said first threshold distance, a usual attachment and milking step is performed, comprising successively attaching and milking of all teats. But if said distance is at least as great as said first threshold distance, a modified milking step is performed. The modified milking step comprises increasing the intended milking frequency of the animal. Alternatively or additionally, the modified milking step comprises attaching a milking cup to and starting to milk a first one of said two teats, and thereafter attaching a milking cup to and/or starting to milk the other one of said two teats only after a waiting time, which waiting time is longer than with the usual attachment and milking step.

The invention is based on the following. The inventors have discovered that when the teats of a dairy animal are too far apart, the known robotic milking devices, also referred to below as 'robot' for short, can no longer reliably provide all teats with a milking cup or milk them with the latter. Because of the limited freedom of movement of the milking cups with respect to the robot arm and thus a limited mutual distance, the distance is simply too great in some cases to be able to attach the next milking cup. In other cases, and actually many of the unsuccessful attempts at attachment or milking operations, the milking cups are indeed attached to the teats, but the tension on the attached milking cup(s) is so great, again due to the limited freedom of movement and mutual distance, that at least one of the milking cups is obliquely attached to the teat. This results in too much leaked-in air being sucked in by the milking cup during milking, which then leads the control unit to conclude that the milking cup has been attached incorrectly, that is to say in such a way as to be ineffective, and aborts the milking operation as being unsuccessful. In particular at the moment when the next milking cup is being attached, in which case the milking cup is still situated on the milking cup holder on the robot arm, the freedom of movement of milking cup(s) which is/are already attached is so limited that that/those milking cup(s) which has/have been attached earlier may be pulled out of position and the milking operation could thus be terminated due to leakage air being sucked in.

In short, the solution consists in reducing the distance between the teats before the remaining milking cup(s) are attached and milking is started. This may be achieved in turn by increasing the milking frequency on purpose to above the usual intended milking frequency. In principle, the latter is fixed, that is to say for dairy animals which do not have an excessively wide udder, based on a combination of the milk production of the dairy animal and, optionally, the number of days in lactation and the like. Usually therefore, this does not depend on a distance between the teats, but with the present invention it does, in practice. Due to the fact that the dairy animals with an excessively wide udder will consequently be milked more often in practice, this udder will no longer become so full, which results in the teats being less far apart. Incidentally, it should be noted here that equivalents of increasing the milking frequency, such as shortening the intended or maximum milking interval or reducing the minimum amount of milk produced which is required to be milked, etc.

Alternatively, a reduction in the distance between the teats may be achieved by attaching one or more first milking cups and already starting to milk. Only after a waiting time will a milking cup be attached to the remaining teat(s), after which milking may in theory be started immediately. As a result of waiting for a waiting time, the udder will become slightly emptier, resulting in the teats being less far apart. Thus, it becomes possible to milk by means of the already attached remaining milking cup(s) without leakage air, at least with a greatly reduced risk thereof.

In particular cases, a milking cup could already be attached to the remaining teat(s), but milking the latter could be postponed. Although there is a risk that leakage air will be sucked in for a brief moment by the already attached milking cup(s), this will stop when the robot arm is moved further in the direction of the already attached and milking milking cup(s) once the remaining milking cup(s) have been attached. The fact is that it is possible, in principle, to already suspend the remaining milking cup(s) from the teat using, for example, a smaller vacuum. After the waiting time, milking can be started immediately, which will reduce the total milking time.

Particular embodiments are described in the dependent claims and in the following part of the description.

In particular, the abovementioned determination comprises measuring said distance on the basis of the positions of the teats determined by the teat position-determining device and comparing them to said first threshold distance. To this end, a (horizontal) distance may be calculated by the control unit, for example on the basis of the determined coordinates.

Alternatively, the abovementioned determination comprises the control unit counting the number of times that, during the past N milking operations, a milking operation of at least one teat failed, with N being a predetermined number, determining an, optionally average, milk yield of a milking operation of said dairy animal, and if said number of times is at least as great as a predetermined threshold number and said milk yield is at least as great as a milk yield threshold, coming to the conclusion that said distance between two teats of the dairy animal, in particular between two front teats and/or two rear teats, is greater than a predetermined first threshold distance. The idea behind this embodiment is that it is not necessary to assign a numerical value to the distance between teats, but that it may be sufficient to consider the success during milking. If many milking operations fail and the dairy animal in addition gives more than a threshold amount of milk, obviously measured during successful milking operations and determined over a standard period, such as a day, then the control unit comes to the conclusion that the teat distance will be too great. After all, the dairy animal will then give so much milk that the udder will be so large that the teats will be far apart. The value for N may be determined freely from empirical values by the manager, for example between 3 and 5 failed milking operations during the past 5 to 10 milking operations, although other figures may be possible. In this case, the expression failed milking operation of a teat is understood to mean that the milking operation of this teat did not succeed because the attachment operation failed or because the milking operation after attaching failed because, for example, leakage air was sucked in, for example due to the milking cup being at too great an angle with respect to the teat, such as caused by an excessive tension which the short milking hose or the retracting means exerted on the milking cup.

In most cases, the robotic milking device is able to attach the milking cups to the teats, but with some large udders there is a risk of a milking cup not milking correctly due to excessive tension on the milking cup, which will consequently be slightly obliquely positioned on the teat, sucks in leakage air, thus resulting in failure of the milking operation. By waiting for a waiting time, the udder will shrink, thus reducing the tension, and leading to a successful milking operation. In embodiments, said modified milking step comprises attaching a milking cup to and immediately starting to milk the other one of said two teats after said waiting time, if said distance between the two teats is greater than a second threshold distance, which is greater than the first threshold distance. In this case, attachment to the other teat is postponed for a waiting time, but milking is immediately started once the milking cup has been attached. This relates in particular to those situations in which the other teat could initially not even be attached due to the distance being too great or the like, but in which the milking does not cause any problems once the milking cup is attached after the waiting time. The idea is again for the udder to become slightly smaller by milking it a little during the waiting time, thus reducing the distance as a result of which attachment can succeed. In a hybrid form, it is also possible to attach the other teat after a first waiting time and to start milking by means of this second milking cup after a second waiting time.

Incidentally, it is pointed out here that it may also be possible for the mutual distance between more than two teats to be too great at the start of the milking session. After all, it is not unlikely that an excessively large udder results in the distance between both the front teats and between the rear teats to be too great, or even between a front and rear teat. Obviously, the present invention is usable for all combinations of two teats of an udder.

In embodiments, said waiting time depends on said distance between said two teats, in particular is greater if said distance is greater. It will be clear that if the distance is only slightly greater than the first threshold distance, the waiting time may be relatively short, but that the waiting time will, on the contrary, be long if said distance is much greater than the first threshold distance. The dependence does not have to be proportional, but may take any form and may be determined, for example, by means of practical measurements. However, it is emphasized here that the waiting time is longer than a possibly appropriate time for normal, undisturbed milking. After all, one or more seconds may pass before a start is made on attaching a next milking cup, for whatever reason. However, the important difference is that a waiting time not equal to zero is always discernable as a time which is longer than this usual time. In this case, the waiting time is the length of the additional time between the attachment of the previous milking cup and the start of attaching the next milking cup, which start is noticeable, for example, by the displacement of the robot arm, the scanning of a next teat position, etc. In practice, the waiting time will usually be at least a few seconds, such as between 5 and 30 seconds.

In embodiments, said waiting time is calculated by the control unit on the basis of said distance between said two teats prior to attaching any milking cup. In these embodiments, the distance prior to the attachment determines the duration of the waiting time. In this case, it is assumed that the udder shrinks according to a fixed pattern, in which case this pattern may, incidentally, differ from animal to animal or from group of animals to group of animals. In addition, this method uses the fact that the distance can be determined more clearly than when one or more teats are obstructed by a milking cup.

In alternative embodiments, a milking cup—teat distance between the milking cup attached to one of said two teats and the other one of said two teats is repeatedly measured by means of the teat position-determining device during the milking operation, and the waiting time runs until the milking cup—teat distance drops below a predetermined milking cup—teat threshold distance. In this case, the teat distance is monitored dynamically and attachment may be effected immediately as soon as the distance drops below the threshold distance. After all, it cannot be accurately predicted when the real distance drops below the threshold distance, because the milking rate and the like may vary from milking session to milking session. By measuring dynamically, it is possible to determine immediately when the distance falls below the threshold, so that as little time as possible is lost waiting.

It is also possible to already attach a milking cup to the other teat, after which the distance between the milking cups is repeatedly measured and milking of the other one of said two teats is started as soon as the distance between the milking cups drops below a milking cup-threshold distance. In this case, just as with other embodiments, it is advantageous if the total milking time remains limited, because for example the milk flow under the action of the hormone oxytocin cannot continue indefinitely.

In a second aspect of the invention, a robotic milking device as claimed in claim 8 is provided, in particular a robotic milking device for milking a dairy animal, and comprising milking means with a plurality of milking cups to be attached to the teats of the dairy animal, a teat position-determining device which is configured to measure the positions of the teats, a robot arm which, in a rest position, carries all milking cups and which is configured to attach the milking cups to the teats, and a control unit for controlling the robotic milking device in order to milk the dairy animal at an intended milking frequency during a milking operation, wherein the robotic milking device is configured to carry out a method according to the first aspect of the invention.

In principle, the advantages of the respective method apply in full to the associated device and therefore it is not necessary to repeat them here. The robotic milking device, also referred to below as 'robot' for short, may be a so-called single-stall system, in which the robot serves a single milking stall for milking a dairy animal, such as a cow. The robot may also be a multi-stall system, in which a plurality of milking stalls is provided, each provided with milking means such as milking cups, and in which a single robot arm which is displaceable between the milking stalls attaches the milking cups to the teats. It is also possible to provide a carousel robot according to the invention, in which a plurality of milking stations are provided on a rotatable platform, each provided with milking cups, and in which one or more robot arms provided outside the platform attach the milking cups to the teats of a dairy animal at a milking station, following which the platform rotates along until the next milking station comes within reach of the robot arm(s).

The invention will now be explained in more detail by means of some non-limiting exemplary embodiment and the drawing, in which.

Figure 1:
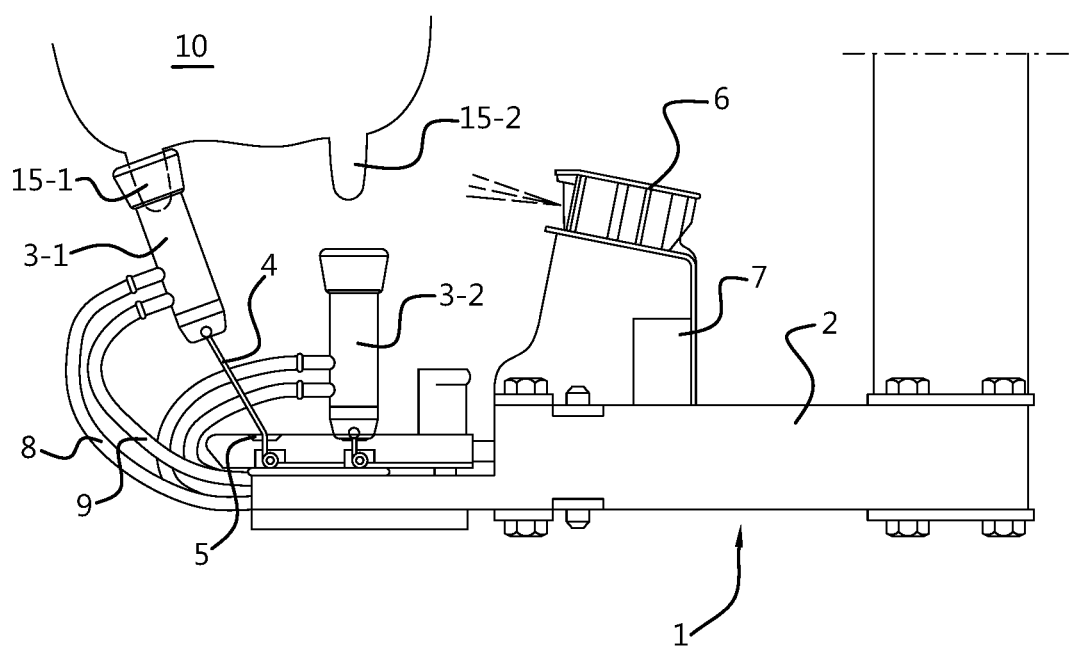
FIG. 1 shows a diagrammatic view of (a part of) a robotic milking device according to the invention.

FIG. 1 shows a diagrammatic view of (a part of) a robotic milking device 1 according to the invention. The robotic milking device 1 is referred to below as 'robot' for short. The illustrated part comprises a robot arm 2 which carries the milking cups 3-1 and 3-2 which are retractable onto the milking cup seat 5 by means of a retracting means 4. Reference numeral 6 denotes a teat position-determining device and reference numeral 7 denotes a control unit, while reference numerals 8 and 9 denote a short milking hose and a pulsation hose, respectively. Finally, an udder 10 with a first teat 15-1 and a second teat 15-2 is shown.

Obviously, the robot 1 has many more components, such as a vacuum pump for pulsation and milk vacuum, and a milk receptacle, but these are not relevant to the present invention. The illustrated robot arm 2 may be of any kind of construction, but does, according to the invention, have to carry all milking cups 3 in the rest position. Robots with a robot arm which retrieves the milking cups individually from a magazine and attaches them to a teat in principle do not suffer from the problem solved by the invention and will be left out of the consideration.

For the sake of clarity, FIG. 1 only shows a first milking cup 3-1 and a second milking cup 3-2, as is sufficient for goats, but for dairy cows, four are provided in principle. The explanation of the invention will therefore be given using these two milking cups and the associated teats 15-1 and 15-2, in which case it should be considered that it applies to any combination of two teats of a dairy animal. In this case, the first milking cup 3-1 is attached to the first teat 15-1 and is connected to the robot arm 2 via the retracting means 4, such as a cord, in order to be pulled back onto the milking cup seat 5 after the milking operation. The second milking cup 3-2 is folded up from the rest position to the attachment position. The teat position-determining device 6, such as a laser scanner or camera, determines the position of the second teat 15-2 with respect to the robot arm 2, and the control unit 7 controls the robot arm 2 in such a way that the second milking cup 3-2 ends up under the second teat 15-2 so as to be attached by an upward movement.

However, it can be seen that the first milking cup 3-1 in this case assumes a very oblique position on the first teat 15-1 due to the fact that the cord 4 is too taut. In this case, it should be noted that the length of the cord 4, and thus the freedom of movement of the associated milking cup (15-1), is limited in order to prevent a kicked-off milking cup or a milking cup to be removed from falling on the floor. Due to the fact that the latter is often very soiled with manure and the like, this would result in the milk becoming contaminated. The length of the cord 4 is thus limited, but as a result the freedom of movement of the milking cups with respect to each other is also limited. In the illustrated example, the udder 10 is very large and consequently the teats 15-1 and 15-2 are very far apart. In particular at the moment of attaching the second milking cup 3-2, when the cord associated with that milking cup cannot provide any extra freedom of movement, the first cord 4 is too taut and the first milking cup 3-1 ends up at an angle on the first teat 15-1. The first milking cup 1 will then probably suck in leakage air, as a result of which the control unit 7 assumes that the milking operation is failing and will abort the milking operation with the first milking cup 3-1. Although the size of the udder illustrated in FIG. 1 has been slightly exaggerated for the sake of clarity, it is in particular with dairy animals with a very full udder that said problem may occur in practice.

Figure 2:
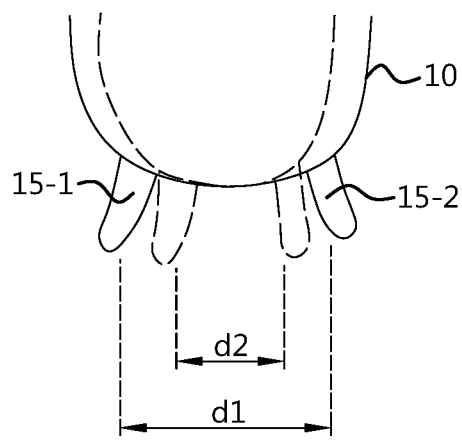
FIG. 2 shows a diagrammatic view of an udder with two different filling levels.

FIG. 2 a diagrammatic view of an udder 10 with two different filling levels. The highest filling level is represented by the full lines and the lowest filling level (of these two filling levels) by the dashed lines. As is known, the filling level of the udder increases over time and for a long time even does so linearly. In practice, the distance between the teats (here again 15-1 and 15-2) will then also increase. In the illustrated example, the distance at the highest filling level is $d_1$ and at the lowest filling level is $d_2$, with $d_1 > d_2$.

The illustrated distance may be determined, for example, by means of the teat position-determining device 6 from FIG. 1. To this end, for example an image of the udder 10 is produced in which the teats, at least two teats, are visible. Alternatively, the position of the two relevant teats is determined in separate position-determining operations, such as in different images. The control unit 7 is then configured to, for example, determine the distance between the relevant teats on the basis of the calculated teat positions.

It is also possible that the control unit 7 does not determine the (absolute) distance, but only determines if the distance is probably greater than permitted, this on the basis of the number of failed milking operations. The control unit 7 keeps track of the teats where the milking operation fails. If, for example, the milking operation of a teat fails (approximately) when attaching a next teat and this happens at least a certain number of times per milking session, then the control unit assumes that something structural is wrong. If, in addition, the milk production of the relevant dairy animal is higher than a certain threshold, then the control unit assumes that the distance between the relevant teats is probably too great, because there is a considerable risk that a high filling level of the udder will occur when the milk yield is high, and for the distance between the teats to be great. Examples of usable numbers of failed milking operations can easily be determined in practice, but certainly depend on the specifications of the robot 1 and of the animals to be milked.

Furthermore, the robot 1 has a first threshold distance between two teats at which both attaching and milking can still take place in a reliable manner. For example, that is a distance $d_3$ in between $d_1$ and $d_2$. This means that the udder with the illustrated highest filling level cannot be attached in a reliable manner and can thus certainly not be milked in a reliable manner. In addition, it is possible that the robot 1 has a second threshold distance $d_4$ at which attaching can be effected in a reliable manner, but milking cannot, as is shown, for example, in FIG. 1. Distance $d_4$ is, for example, smaller than $d_2$. In the illustrated example, the udder with the lowest filling level can thus still be attached in a reliable manner by both teats, but the second teat which was attached cannot be milked in a reliable manner (as in FIG. 1). The udder with the highest filling level cannot even be reliably attached in this case.

Obviously, all numerical values of the threshold distances depend on the design of the robot arm, so that it is impossible to provide any useful examples here. However, it will be easy to determine these in practice.

The two illustrated filling levels also provide a hint with regard to a first solution to the problem according to the present invention. In this case, it is assumed that a teat distance $d_1$ is too great for the robot to be able to perform the attachment and milking operations reliably, but that it can do so at the distance $d_2$. Then, it is possible to ensure that the udder 10 no longer becomes so full and large that the teat distance exceeds $d_2$ by ensuring that the (maximum or intended) milking interval becomes smaller. Then, the dairy animal has less time to produce milk and the udder becomes less full.

Of course, it is not possible for the control unit to bring about shortening of the maximum milking interval for a dairy animal actively when the dairy animals are free to roam. After all, the latter in principle determine when they want to visit the robot themselves. On the other hand, it is possible for the control unit to notify the manager of the herd sooner than was previously the case that a dairy animal has to be collected and taken to the robot for a milking session. It is furthermore generally possible to configure the control unit in such a way that the control unit always sends a warning to the manager after a milking animal exceeds a maximum milking interval associated with the threshold distance(s) so that he can manually attach and/or milk the dairy animal, because the robot is no longer able to attach and/or milk the dairy animal.

Shortening the intended average milking interval can actually be controlled by the control unit, for example by allowing the dairy animal to be milked sooner. During subsequent visits to the robot, the average interval will also become shorter and excessively long milking intervals with attachment and milking problems are effectively avoided. In this case, shortening the intended milking interval also takes place entirely automatically by an intervention of the control unit 7, obviously accompanied by a message on an attention list or otherwise to the user/dairy animal manager. On the one hand, this prevents additional work from having to be performed and, on the other hand, the often highly productive dairy animals are not unnecessarily removed from the herd.

Another or additional problem-solving measure according to the present invention consists in attaching the first milking cup and to start milking, and in the second milking cup either being attached, but not to allow it to start milking, or not even being attached. In that case, a waiting time has to lapse first. By milking with the first milking cup (or cups), the udder will already become slightly emptier and will thus become smaller. If this makes the distance between the teats sufficiently small, the milking operation or the attachment attempt will actually succeed.

It should be noted that, in practice, it is not only possible to determine the one or more threshold distances, but also the profile of the teat distance as function of time and/or of the amount of milk obtained. With a reliable constant or predictable milking rate, it is sufficient to measure the time since the start of the milking operation in order to calculate how the teat distance will change. Because dairy animals are not machines with fixed specifications, it may be advantageous to base this calculation on the amount of milk obtained from the relevant teat or teats. After all, this determines, together with the initial teat distance, how the distance will change. Incidentally, the numerical values for these dependencies can actually be determined in practice.

Figure 3:
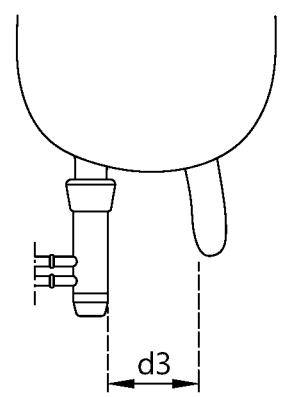
FIG. 3 shows a diagrammatic view of an udder with one attached milking cup.

FIG. 3 shows a diagrammatic view of an udder with one attached milking cup and is intended to illustrate exemplary embodiments in which it is not the starting distance between the teats which is determined, but the distance between the teat which has not yet been attached and the milking cup on the attached teat is determined repeatedly. After all, it is due to this milking cup that the true teat distance cannot be determined dynamically during milking. The object of this figure is to make clear that the teat distance from FIG. 2 may be slightly different from the true teat distance. After all, the milking cup itself has a thickness which is not insignificant and this may, moreover, affect the teat orientation. In such cases, it may be an alternative to repeatedly determine precisely the distance between the milking cup and the non-attached teat, for example starting immediately after said milking cup has been attached. This milking cup/teat distance will also change during milking and, in particular, become smaller. In a similar way, the control unit can then determine when the milking cup/teat distance drops under an associated threshold distance, after which attaching or milking may be effected in a reliable manner.

The illustrated exemplary embodiments are only intended to serve as an explanation of the invention, without limiting the latter. The scope of protection is defined in the attached claims.

The invention claimed is:

1. A method for milking a dairy animal in milking operations using a robotic milking device, which robotic milking device comprises:
- a milking means with a plurality of milking cups to be attached to teats of the dairy animal,
- a teat position-determining device which is configured to measure positions of the teats,
- a robot arm which, in a rest position, carries all milking cups and which is configured to attach the milking cups to the teats, and
- a control unit for controlling the robotic milking device in order to milk the dairy animal at an intended milking frequency in a milking operation, wherein the method comprises:
- determining, by means of the teat position-determining device, if a distance between two teats of the dairy animal, is greater than a predetermined first threshold distance, and
- if said distance is at most equal to said predetermined first threshold distance, performing a usual attachment and a milking, comprising successively attaching and milking of all teats,
- but if said distance is greater than said predetermined first threshold distance, performing a modified milking, comprising:
- increasing the intended milking frequency of the dairy animal, and/or
- attaching a first milking cup to and starting to milk a first one of said two teats, and thereafter attaching a second milking cup to and/or starting to milk a second one of said two teats only after a waiting time, which waiting time is longer than with the usual attachment and the milking.

2. The method according to claim 1, wherein said determining comprises measuring said distance on the basis of the positions of the teats determined by the teat position-determining device and comparing them to said predetermined first threshold distance.

3. The method according to claim 1, wherein said determining further comprises:
- the control unit counting a number of times that, during a past N milking operations, a milking operation of at least one teat failed, with N being a predetermined number,
- determining a milk yield of a milking operation of said dairy animal, and
- if said number of times is at least as great as the predetermined threshold number and said milk yield is at least as great as a milk yield threshold, then concluding that said distance between two teats of the dairy animal is greater than the predetermined first threshold distance.

4. The method according to claim 1, wherein said modified milking comprises attaching a milking cup to and immediately starting to milk the second one of said two teats after said waiting time, if said distance between the two teats is greater than a second threshold distance, which is greater than the first threshold distance.

5. The method according to claim 1, wherein said waiting time depends on said distance between said two teats.

6. The method according to claim 1, wherein said waiting time is calculated by the control unit on the basis of said distance between said two teats prior to attaching any milking cup.

7. The method according to claim 1, wherein a milking cup-teat distance between the milking cup attached to the first one of said two teats and the second one of said two teats is repeatedly measured by the teat position-determining device during the milking operation, and wherein the waiting time runs until the milking cup-teat distance drops below a predetermined milking cup-teat threshold distance.

8. A robotic milking device for milking a dairy animal comprising:
- the milking means with a plurality of milking cups to be attached to the teats of the dairy animal,
- the teat position-determining device which is configured to measure positions of the teats,
- the robot arm which, in a rest position, carries all milking cups and which is configured to attach the milking cups to the teats, and
- the control unit for controlling the robotic milking device in order to milk the dairy animal at an intended milking frequency in a milking operation, wherein the robotic milking device is configured to carry out the method according to claim 1.

9. The method according to claim 1, wherein the distance is a distance between two front teats and/or two rear teats.

10. The method according to claim 1, wherein said waiting time depends on said distance between said two teats and is greater if said distance is greater.

* * * * *